April 5, 1927.  
C. N. HARE  
1,623,341  
OCEAN COMPRESSED AIR POWER  
Filed Aug. 17, 1921  4 Sheets-Sheet 1
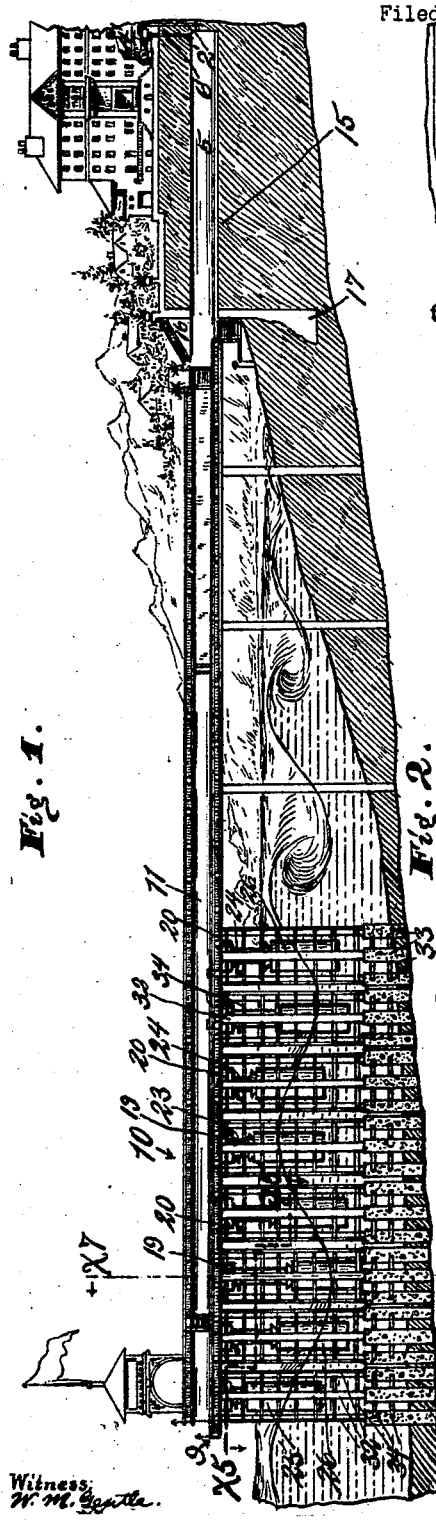
Inventor.  
Charles N. Hare.

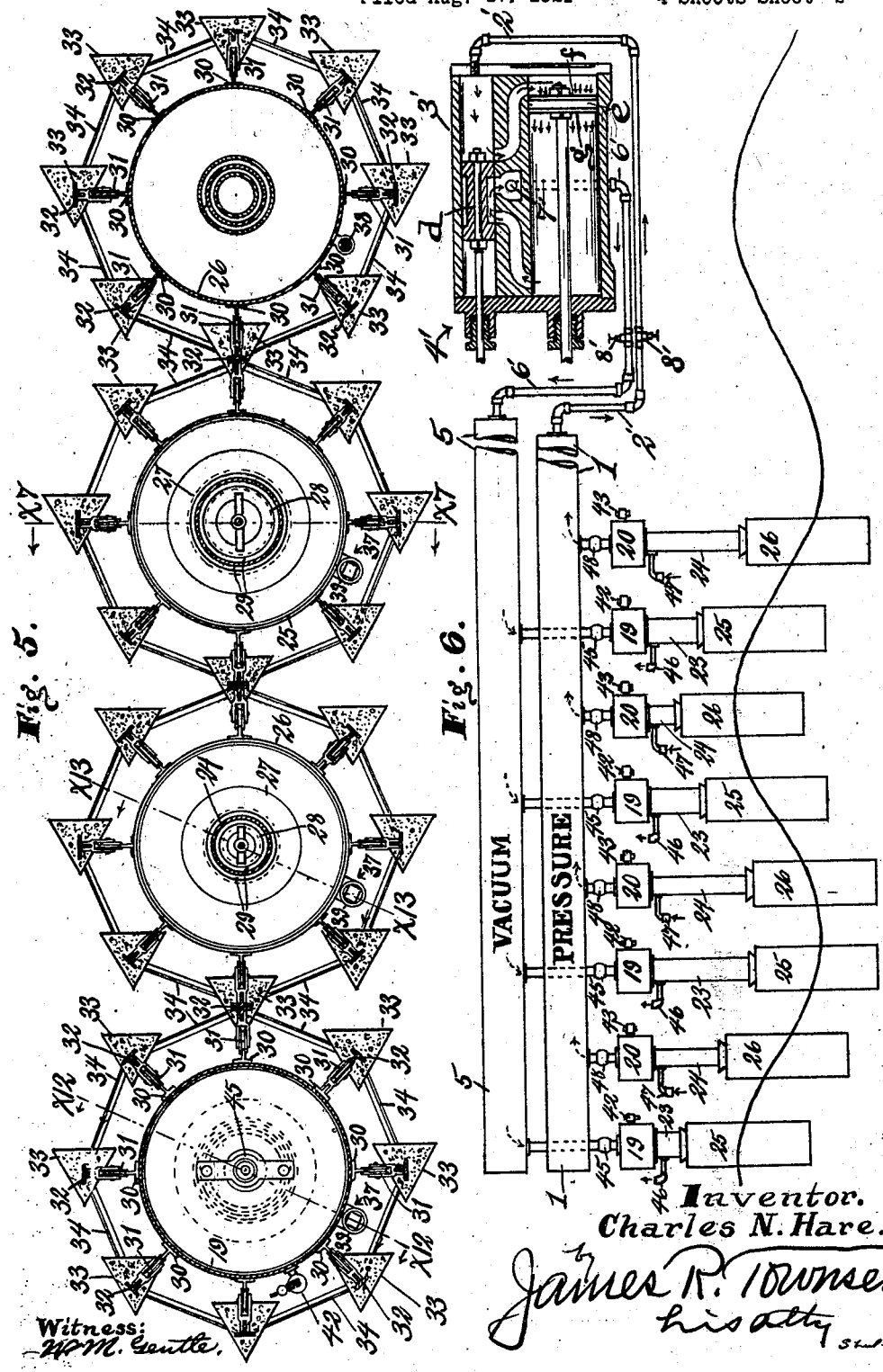

April 5, 1927.  1,623,341
C. N. HARE
OCEAN COMPRESSED AIR POWER
Filed Aug. 17, 1921  4 Sheets-Sheet 3
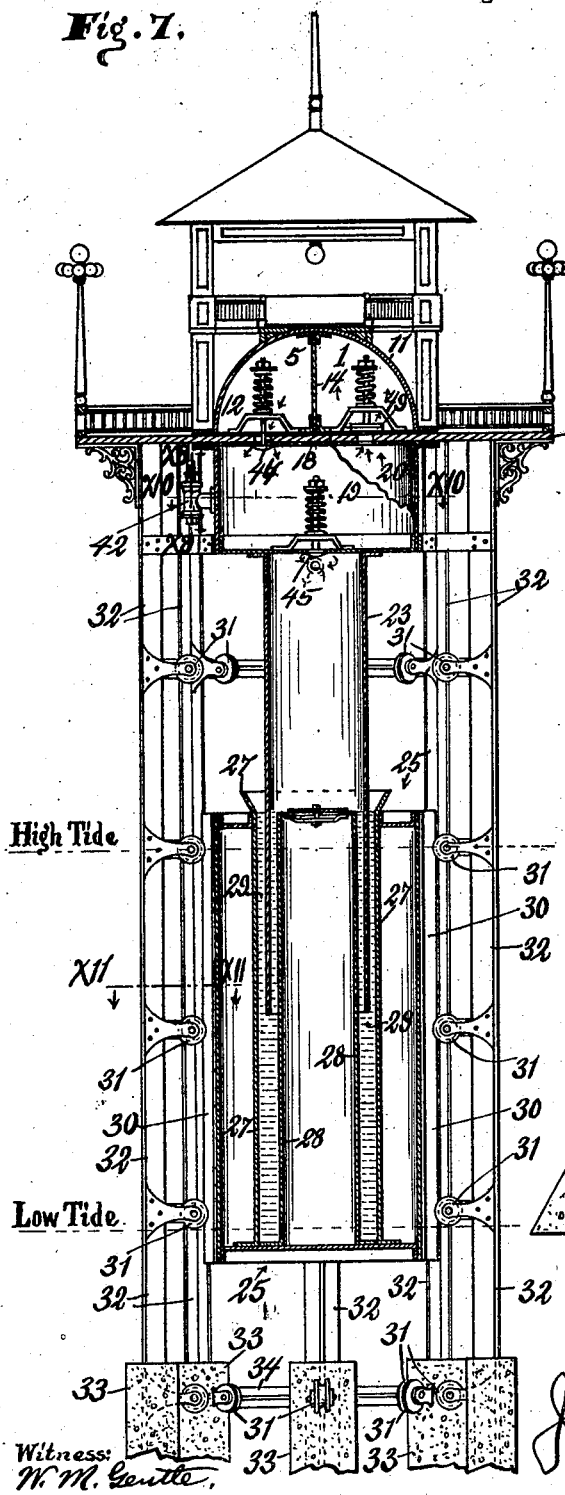
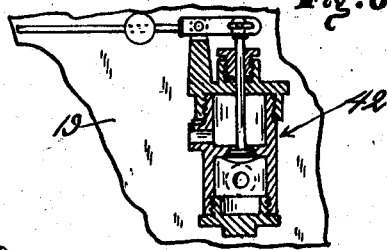
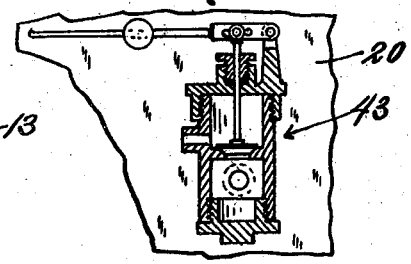
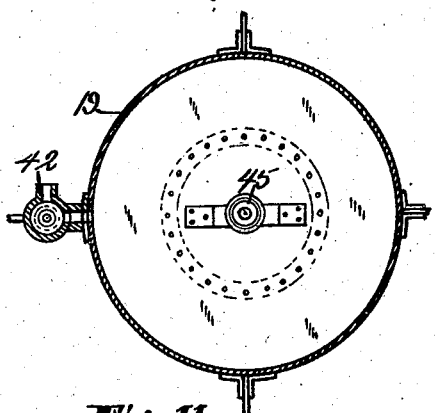
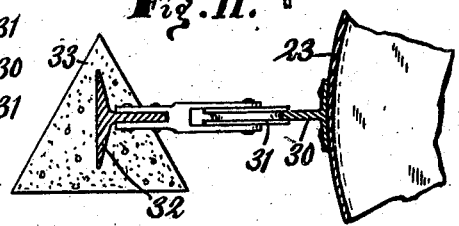
Inventor.
Charles N. Hare.

April 5, 1927. 1,623,341
C. N. HARE
OCEAN COMPRESSED AIR POWER
Filed Aug. 17, 1921  4 Sheets-Sheet 4
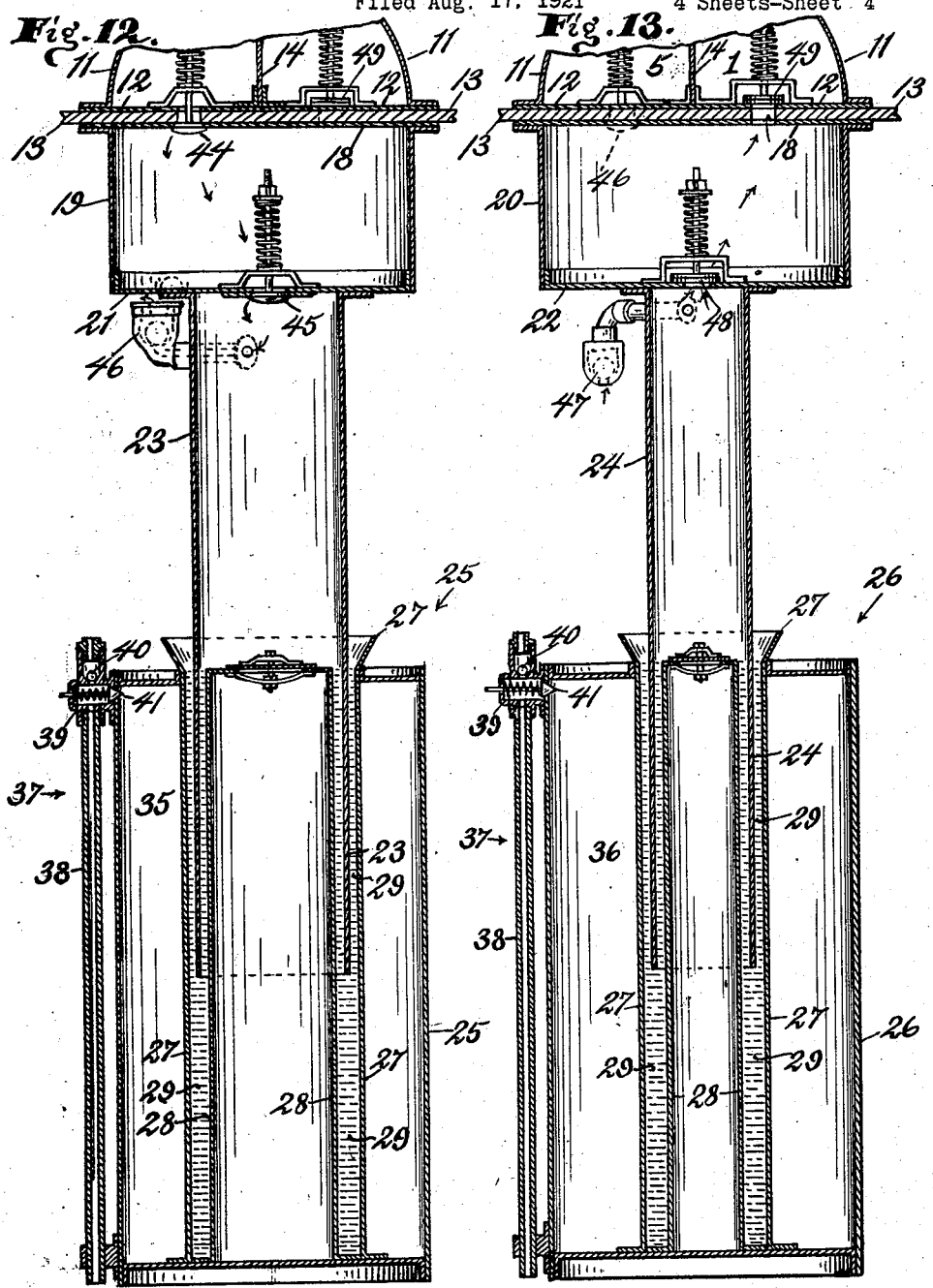
Inventor.
Charles N. Hare.
Witness:

Patented Apr. 5, 1927.

1,623,341

UNITED STATES PATENT OFFICE.

CHARLES N. HARE, OF LIMA, OHIO.

OCEAN COMPRESSED-AIR POWER.

Application filed August 17, 1921. Serial No. 493,031.

This is an improvement of my ocean compressed air power shown and described in my applications, filed November 3rd, 1920, Serial No. 421,569, patented August 30, 1921, No. 1,389,445 and June 7, 1921, Serial No. 475,584 patented October 9, 1923, No. 1,470,361.

An object of this invention is to provide an appliance operable by wave and tide motion that is effective in compressing air in large volume and storing it in a tank of vast capacity; and that also is actuated by the same means to exhaust air from a tank of large dimensions so as to form a vast vacuum, and means in combination therewith to operate engines.

An object of the invention is to provide a simple and effective means in condensed form for utilizing wave and tide motion to develop power.

An object of the invention is to provide a wave and tide operated air compressing and vacuum forming appliance that is simple in construction, and effective in operation, and that is strong and durable and not likely to be injured by heavy tides and waves.

An object of invention is to provide an appliance means analagous to my said former inventions that will increase the engine efficiency without alteration or change in the engine; that is, I increase the power obtainable from the engine of the former constructions. In other words with steam or air engines with reciprocating pistons I alternately apply compressed air first on one side of the piston and then on the other side in the usual way, and I also alternately apply on the side of the piston opposite that on which the compressed air is applied a suction and with a rotary engine I apply a suction at the exhaust end of the engine to co-act with the compressed air to actuate the shaft of said engine.

An object of invention is to provide means whereby the powers of compressed air and suction by vacuum are made continuously available for actuating engines or appliances using compressed air and vacuum for motive power and to that end I provide an immense storage tank for air and a corresponding vacuum tank with means connected therewith for continuously maintaining air pressure and vacuum in the respective tanks for simultaneous application to opposite sides of the piston in alternation.

Other objects, advantages and features of invention may appear from the accompanying drawings, the subjoined detail description and the appended claims.

The accompanying drawings illustrate the invention.

Figure 1 is an elevation of a plant embodying the invention, some of the parts shown in other views being omitted from this view for clearness.

Fig. 2 is a diagrammatic plan of the plant shown in Fig. 1.

Fig. 3 is a diagrammatic side elevation of a plant constructed with my invention as operatively connected to a turbine engine; the pier structure being omitted, and all the reciprocating tanks being shown at rest.

Fig. 4 is a diagrammatic section on line $x^4$, Fig. 3.

Fig. 5 is a horizontal section on staggered line $x^5-x^5$, Fig. 1.

Fig. 6 is a fragmental diagrammatic side elevation of a plant embodying my invention operatively connected to a cylinder of a reciprocating engine showing my reciprocating tanks actuated by wave motion.

Fig. 7 is a vertical cross section on line $x^7$, Fig. 1.

Fig. 8 is a section on line $x^8$, Fig. 7, showing a detail of one of the safety valves attached to the vacuum tanks.

Fig. 9 is a section similar to Fig. 8 through a safety valve on one of the pressure tanks.

Fig. 10 is a horizontal section on line $x^{10}$, Fig. 7.

Fig. 11 is a horizontal cross section on line $x^{11}$, Fig. 7, showing a detail of one of the guides for my reciprocating tank.

Fig. 12 is a fragmental vertical section on line $x^{12}$, Fig. 5, showing a detail of a vacuum unit independently of its guides.

Fig. 13 is a fragmental vertical section on line $x^{13}$, Fig. 5 showing a detail of an air compressing unit independently of its guides, which are omitted.

It is understood in the following description, that the term vacuum is used to indicate a depression below atmospheric pressure.

I provide a main compressed air storage tank 1 that is connected by a pipe 2 to the inlet end 3 of a turbine engine 4 or the same connection is made by pipe 2' to a valve chest 3' of a reciprocating engine 4'; and also a main vacuum tank 5, corresponding in dimensions to tank 1, and which is connected by a pipe 6 to the discharge end 7 of turbine engine 4 or by pipe 6' to the exhaust port 7' of a reciprocating engine 4'; so that when the tank 1 is charged with air, and a vacuum is formed in tank 5, the compressed air and vacuum will co-act to actuate engines 4, 4'. That is compressed air from tank 1 will discharge through directrix $a$ against one side of buckets $b$ of wheel $c$, (see Fig. 4); and the vacuum in tank 5 will greatly increase the velocity of the air by suction and consequently increase the air impact on the turbine buckets, and correspondingly increase the engine efficiency; and in the reciprocating engine 4' the slide valve $d$ will alternately reverse the air pressure and suction to opposite sides of piston $e$ so that when there is pressure on the side $f$ there will be a suction on the side $g$ and vice versa, so that the force applied toward moving the piston is increased as compared with its operation by the air pressure side only, thereby greatly increasing the engine's efficiency.

Pipes 2, 2' and 6, 6' are provided with valves 8, 8' by which the speed of engines 4, 4' is regulated.

I provide means for continuously and simultaneously supplying compressed air power and producing vacuum to actuate engines 4, 4' as hereinbefore described; and this means consists of ocean wave and tide actuated air compressors and vacuum producers that operate to continuously force air into tank 1 and produce a vacuum in tank 5; and I locate the air compressors and vacuum producers at the sea end 9 of a pier 10 where they are continuously subjected to tide and wave motion.

Tanks 1, 5 are formed of an elongated semicircular shell 11 that has edge flanges secured to a base plate 12 on pier platform 13; and a center wall 14 divides the enclosure of shell 11 into compartments or tanks 1, 5; and these tanks are formed along the full length of pier 10 and also extend a considerable distance into a palisade 15 so that they are of great capacity; and preferably the structure is of sheet iron so that the weight thereof will hold the pier down against upward thrust of the tide or waves.

Pier 10 is preferably constructed so that its land end 16 abuts a concrete wall 17 erected against a natural palisade 15 so that the pier is supported against tide or wave thrust by a substantial backing.

It is understood that parts 11, 12, 14 hereinbefore mentioned and other plates, tanks and cylinders hereinafter mentioned are formed of standard sheet iron plates properly secured together by well known means such as riveting, bolting and welding; but which are not shown or described in detail for the sake of brevity and clearness.

On the underside of the pier platform 13 there is secured a metal plate 18 that corresponds in length and width to plate 12; and under it are arranged a series of cylindrical auxiliary air storage and vacuum tanks 19, 20, that at their upper ends are provided with outwardly extending flanges by which they are secured by welding to plate 18 and they are arranged in alignment and alternate order so that their axes are perpendicular to the longitudinal axis of pier 10.

The bottom ends of the series of auxiliary tanks 19, 20 are closed by plates 21, 22; and to these plates are secured the flanged upper ends of the series of stationary vacuum cylinders 23, and the series of stationary compressor cylinders 24 that correspond to the stationary cylinders 23 and 24 respectively, shown in my patents to which I have hereinbefore referred.

Cylinders 23, 24 are preferably arranged in alternate order and are substantially alike except that the vacuum cylinders 23 are considerably greater in diameter than the compressed air cylinders, and this difference in diameter is for the purpose of equalizing the pressure and vacuum.

I provide a series of reciprocating cylinders 25, 26 in which are centrally secured water-seal cylinders 27, 28 having water-seals 29 that are adapted to telescope with stationary cylinders 23, 24 when actuated by wave or tide. The reciprocating tanks 25, 26 are provided with guides 30 that are spaced equidistant around, and are secured to the outer walls of said tanks; and engaging these guides are rollers 31 that are spaced along, and are attached to the uprights 32.

These uprights are preferably T-beams with their lower ends secured in triangular cement piers 33 with their upper ends secured by any well known means to pier 10; and the uprights are spaced equidistant apart and arranged so that they hold each of the reciprocating tanks from sidewise movement and so that their reciprocation is central to the longitudinal axis of stationary cylinders 23, 24.

Uprights 32 are connected by cross braces 34 which construction forms a substantial cage for each of the reciprocating tanks 25, 26.

Said tanks 25, 26 are made buoyant by exhausting the air from them so as to form a partial vacuum in their respective chambers 35, 36 and these partial vacuums are produced by appliances 37 secured to the sides of the tanks. These appliances consist of pipes 38 with their upper ends secured in valve casings 39 that are attached to the upper sides of tanks 25, 26; and the casings 39 are provided with valves 40, 41 that open and close to exhaust air from the tanks by action of water in pipes 38 that have their bottom ends open so that they fill with water by opening of valves 40 as the tanks descend, and the water pressure from the pipes closes valves 40 and opens valves 41 and draws air from the tanks by suction when the tanks are moving upwardly relatively to the surface of the water, that is when the tanks are pitched upward; it being understood, of course, that the momentum of tanks 25, 26 when in action, will submerge such tanks below their buoyancy line so that pipes 38 will nearly fill with water that will discharge by gravity when the tanks are pitched upward by tide or wave motion.

Cylinders 27 have their upper ends extended higher than cylinders 28 and are bulged to prevent overflow of liquid seal 29 when cylinders 23, 24 are telescoped by upward movement of tanks 25, 26.

Auxiliary tanks 19 are also provided with safety valves 42 shown in detail in Fig. 8; and tanks 20 are provided with safety valves 43 shown in Fig. 9 that operate to prevent excessive suction or pressure from displacing the liquid seal 29 from between cylinders 27, 28.

Suction valves 44, 45 are provided between vacuum tank 5, auxiliary tank 19 and cylinder 23 that open to exhaust air from tank 5 when reciprocating tanks 25 descend, and close on the upward movement of the tanks, and cylinders 23 are provided with check valves 46 that permit air to exhaust from the cylinders 23 respectively on the upward stroke of tanks 25 and that close on the downward stroke.

Cylinders 24 are provided with air inlet valves 47 that open on the downward stroke of tanks 26, and outlet valves 48, 49 are provided between cylinders 26, auxiliary tanks 20 and pressure tank 1, by which air taken into cylinders 24 is driven through valve 48, first into the auxiliary tank and then through valve 49 into pressure tank 1.

In practical operation, the reciprocating tanks 25, 26 are actuated by waves or tides to force them upward and they descend by gravity; and the valves are so arranged that the reciprocation of tank 25 forms a vacuum in tank 5 and action of tank 26 produces a pressure in tank 1.

To the extent that tide and wave motion are continuous their action on the hereinbefore mentioned tanks will produce a practically continuous effect of alternating vacuum and pressure that are adapted to co-act in running a turbine, a rotary, or reciprocating engine as hereinbefore described.

I claim:

1. In combination with a base, an upright secured to said base; of a stationary vacuum tank secured to said uprights; a stationary vaccum cylinder connected to said stationary vacuum tank; a wave actuated reciprocating tank having cylinders adapted to reciprocate with the stationary vacuum tank; and an auxiliary tank interposed between the stationary vacuum tank and stationary vacuum cylinder; a suction valve provided between the stationary vacuum tank and the stationary vacuum cylinder, adapted to exhaust air in the stationary vacuum tank; and valves provided on the vacuum cylinder to permit air to be exhausted therefrom on the upward stroke of the reciprocating tank.

2. In combination with a base, an upright secured to said base; of a stationary vacuum tank, a stationary vacuum cylinder communicating with said vacuum tank; an auxiliary tank interposed between the stationary vacuum tank and cylinder; a wave actuated tank having cylinders adapted to telescope with the stationary tank; and valves interposed between the wave actuated tank and stationary vacuum tank for regulating the exhaust of air in the vacuum tank to create vacuum therein.

3. In combination with a base, an upright secured to said base; of a stationary vacuum tank arranged above said upright; a stationary vacuum cylinder communicating with said vacuum tank; a reciprocating wave actuated cylinder operable on said upright and telescoping the said stationary vacuum cylinder; an auxiliary vacuum chamber interposed between the stationary vacuum tank and vacuum cylinder; and valves in said auxiliary cylinder adapted to function whereby air may be exhausted from the stationary vacuum tank when said reciprocating cylinder is actuated in one direction.

4. In combination with a base, an upright secured to said base; of a main air storage tank of relatively large capacity, secured to the upright; a corresponding vacuum tank; a series of auxiliary air tanks in communication with said main air storage tank, a series of auxiliary vacuum tanks arranged in alternate order to said auxiliary air tanks, said auxiliary vacuum tanks being in communication with said main vacuum tank; reciprocating tanks for drawing and forcing air through said auxiliary tanks into and out of said main tanks; and valves in said auxiliary vacuum tanks for exhausting air therefrom to produce a vacuum in the said main vacuum tank.

5. An apparatus comprising a main air storage tank of large capacity, an auxiliary air tank having a passage communicating with said air storage tank; valves controlling the air passage between the auxiliary and main air storage tanks; a cylinder secured to the bottom of said auxiliary air tank; a reciprocating tank for forcing air to said cylinder and auxiliary tank into the main air storage tank; and means for producing a continuous flow of air under pressure to the main air storage tank.

6. An apparatus comprising a stationary cylinder; a reciprocating tank forming a chamber and having cylinders adapted to telescope with said stationary cylinder; and wave actuated means to produce a partial vacuum in said chamber, to make said tank more buoyant.

7. An apparatus comprising a stationary cylinder, a reciprocating tank forming a chamber; cylinders in said tank adapted to telescope with said stationary cylinder; a water-seal between said stationary and reciprocating cylinders; and wave actuated means to produce and maintain a partial vacuum in said chamber.

8. An apparatus comprising a stationary cylinder; a reciprocating tank forming a chamber and having cylinders adapted to telescope with said stationary cylinder; a valve casing attached to said tank; a pipe having its upper end secured in said valve casing and having its bottom end open; and valves in said casing, one of which is operated by water entering said pipe as the tank drops into the water to permit air therein to be exhausted, and the other of which is operated by the discharge of water in said pipe by gravity as the tank is pitched above the water, to draw air from said chamber.

9. An apparatus comprising a stationary cylinder; a reciprocating tank forming a chamber; cylinders in said tank adapted to telescope with said stationary cylinder; a water-seal between said stationary and reciprocating cylinders; a pipe connected to said tank and being open on its lower end and in communication with said chamber through a valve controlled passage, and means whereby the air in said pipe is exhausted by wave action and air is withdrawn from said chamber to produce a partial vacuum therein.

In testimony whereof, I have hereunto set my hand at Los Angeles, California, this 10th day of August, 1921.

CHARLES N. HARE.